US008116303B2

(12) United States Patent
Toscano et al.

(10) Patent No.: US 8,116,303 B2
(45) Date of Patent: *Feb. 14, 2012

(54) SYSTEMS AND METHODS FOR COMMUNICATING DOCUMENTS VIA AN AUTONOMOUS MULTIPLE-FUNCTION PERIPHERAL DEVICE

(75) Inventors: Francis Toscano, Kendall Park, NJ (US); Samuel Nathan Kamens, Highland Park, NJ (US); Joachim Braun, Freehold, NJ (US)

(73) Assignee: Xpedite Systems, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/860,899

(22) Filed: Aug. 22, 2010

(65) Prior Publication Data
US 2010/0315683 A1 Dec. 16, 2010

Related U.S. Application Data

(63) Continuation-in-part of application No. 11/852,315, filed on Sep. 9, 2007, and a continuation of application No. 12/207,310, filed on Sep. 9, 2008, now Pat. No. 7,804,823.

(51) Int. Cl.
- *H04L 12/28* (2006.01)
- *H04L 12/56* (2006.01)
- *G06F 3/12* (2006.01)
- *H04N 1/00* (2006.01)

(52) U.S. Cl. ....... 370/356; 370/354; 370/355; 358/1.15; 358/403

(58) Field of Classification Search .......... 370/356, 370/354, 355; 358/1.15, 403
See application file for complete search history.

(56) References Cited

U.S. PATENT DOCUMENTS

| 4,187,520 A | 2/1980 | Beduchaud |
| 4,764,951 A | 8/1988 | Kotani et al. |
| 5,222,211 A | 6/1993 | Mueller |
| 5,291,302 A | 3/1994 | Gordon |
| 5,367,619 A | 11/1994 | Dipaolo |
| 5,375,176 A | 12/1994 | Spitz |
| 5,386,298 A | 1/1995 | Bronnenberg |
| 5,434,775 A | 7/1995 | Sims et al. |
| 5,563,998 A | 10/1996 | Yaksich |
| 5,664,185 A | 9/1997 | Landfield et al. |
| 5,675,507 A | 10/1997 | Bobo, II |
| 5,991,469 A | 11/1999 | Johnson |

(Continued)

FOREIGN PATENT DOCUMENTS

JP 2002 009976 1/2002

(Continued)

OTHER PUBLICATIONS

International Search Report for WO 2010/030601; issued on Mar. 18, 2010.

(Continued)

*Primary Examiner* — Ronald Abelson
(74) *Attorney, Agent, or Firm* — King & Spalding

(57) ABSTRACT

A multiple-function peripheral device includes a packet-switched network interface and an autonomous application programming interface. The application programming interface requests image information from a remote server via the packet-switched network interface in a first mode of operation. The application programming interface sends image information to a remote device via the packet-switched network interface in a second mode of operation.

20 Claims, 9 Drawing Sheets

U.S. PATENT DOCUMENTS

| | | | |
|---|---|---|---|
| 6,020,980 | A | 2/2000 | Freeman |
| 6,972,858 | B1 | 12/2005 | Nishida et al. |
| 6,981,023 | B1 | 12/2005 | Hamilton et al. |
| 6,985,494 | B2 | 1/2006 | Thompson |
| 7,509,648 | B1 | 3/2009 | Afshar et al. |
| 7,613,280 | B1 | 11/2009 | Lunde et al. |
| 7,620,177 | B2 | 11/2009 | Ibrahim et al. |
| 7,904,811 | B2 | 3/2011 | Saito |
| 2002/0054367 | A1 | 5/2002 | Tsuchiya |
| 2002/0133516 | A1 | 9/2002 | Davis et al. |
| 2002/0165822 | A1 | 11/2002 | Makipaa |
| 2003/0093322 | A1 | 5/2003 | Sciuk |
| 2003/0112472 | A1 | 6/2003 | Eguchi et al. |
| 2003/0187939 | A1 | 10/2003 | O'Brien |
| 2003/0233414 | A1 | 12/2003 | Henry |
| 2003/0233467 | A1* | 12/2003 | Ogasawara ............ 709/232 |
| 2004/0186895 | A1 | 9/2004 | Ellis |
| 2005/0134903 | A1 | 6/2005 | Tanimoto |
| 2005/0141485 | A1* | 6/2005 | Miyajima et al. ............ 370/352 |
| 2005/0179961 | A1 | 8/2005 | Czyszczewski et al. |
| 2006/0026597 | A1 | 2/2006 | Sakou |
| 2006/0044598 | A1 | 3/2006 | Etelapera |
| 2006/0291453 | A1 | 12/2006 | Kuwahara |
| 2007/0011362 | A1* | 1/2007 | Umekage et al. ............ 710/15 |
| 2007/0106904 | A1 | 5/2007 | Christoff et al. |
| 2007/0115512 | A1 | 5/2007 | Noel et al. |
| 2007/0198560 | A1 | 8/2007 | Foygel et al. |
| 2007/0247661 | A1 | 10/2007 | Minami et al. |
| 2007/0255628 | A1 | 11/2007 | Takahashi et al. |
| 2008/0089327 | A1* | 4/2008 | Lu et al. ............ 370/389 |
| 2008/0183754 | A1* | 7/2008 | Kitada ............ 707/104.1 |
| 2008/0263071 | A1 | 10/2008 | Ferlitsch et al. |
| 2009/0025078 | A1* | 1/2009 | Kuehr-McLaren et al. .... 726/14 |
| 2009/0210383 | A1* | 8/2009 | Seemann ............ 707/3 |
| 2009/0244638 | A1 | 10/2009 | Evevsky |
| 2009/0300380 | A1* | 12/2009 | Vojak et al. ............ 713/310 |

FOREIGN PATENT DOCUMENTS

| | | |
|---|---|---|
| JP | 2002-009976 | 1/2002 |
| JP | 2003-219128 | 11/2003 |
| JP | 2003 319128 | 11/2003 |
| JP | 2005244794 | 9/2005 |
| KR | 20030056621 | 7/2003 |
| KR | 20060112501 | 11/2006 |
| WO | WO 2006/089223 | 8/2006 |
| WO | WO 2006089223 | 8/2006 |

OTHER PUBLICATIONS

International Search Report for WO 2009/032872; issued on Mar. 12, 2009.

Supplemental European Search Report for EP 09813499; issued on Jul. 18, 2011.

Supplemental European Search Report for EP Patent Application No. 09813499.2 mailed Jul. 18, 2011.

Utano, Jack, "Use of Facsimile Technology in Document Delivery Systems," Mar. 1992: CENDI-Integrated Computer Systems, Inc., Oak Ridge, TN.

* cited by examiner

SYSTEMS AND METHODS FOR COMMUNICATING DOCUMENTS VIA AN AUTONOMOUS MULTIPLE-FUNCTION PERIPHERAL DEVICE

RELATED APPLICATIONS

The present application is a continuation-in-part (CIP) of U.S. Utility patent application Ser. No. 11/852,315, filed on Sep. 9, 2007, entitled "Systems and Methods for Communicating Documents," and a continuation of U.S. Utility patent application Ser. No. 12/207,310, filed on Sep. 9, 2008, entitled "Systems and Methods for Communicating Documents Via an Autonomous Multiple-Function Peripheral Device," which are entirely incorporated herein by reference.

BACKGROUND

Facsimile (fax) technology has been a successful means to transmit documents electronically. With the emergence of publicly accessible data networks and electronic mail (e-mail) applications, it appeared as though that fax communications would be rapidly replaced by e-mail. However, it is now clear that the two technologies will co-exist for a while.

In a deployment of fax machines in an office environment equipped with Internet access, a fax server is connected to the public switched telephone network (PSTN) by one or more dedicated lines, such as T1/E1. As observed from the perspective of the fax server, the PSTN is both the source of incoming faxes as well as the destination for outgoing faxes. The fax server is also connected to a packet-switched network, which provides connections to users. In this way, the fax server provides desktop faxing capabilities via various e-mail applications. The fax server can also be used to provide fax-back transaction confirmation, fax broadcasting or automated form processing.

The fax server uses specialized interface circuits for converting the fax information communicated by the users. When a document arrives at the fax server, the fax server converts the document into a format that is suitable for transmission over the PSTN. Thereafter, the fax server sends the converted document over the PSTN via its dedicated interface circuits. Conversely, for a fax arriving at the fax server, the fax server identifies the destination user, converts the incoming fax transmission into a format suitable for delivery to the destination user, and sends the converted document to the destination user over the internal IP network.

In a common enterprise, the users are not only connected to the fax server via the internal internet protocol (IP) network, but are also connected to an internetworking gateway, which connects the internal IP network to the Internet. The gateway allows a user to communicate electronically with other parties connected to the Internet. Such electronic communications may include store-and-forward messages (e.g., e-mail), real time one-way communications (e.g., live TV), real time two-way communications (e.g., Internet telephony, etc.).

The gateway is typically connected to an Internet Service Provider (ISP). The connection between the gateway and the ISP or the PSTN is typically established via dedicated T1/E1 lines or in some cases optical fiber, similar to the connection between the fax server and the PSTN.

It is apparent that a first set of dedicated T1/E1 lines are required to provide fax functionality and a second set of dedicated T1/E1 lines or other data transmission media are required to provide Internet access. The use of two sets of dedicated data transmission media is expensive to maintain and, moreover, it is possible to experience the situation in which either set of lines is idle while the other set is being used at its maximum capacity. In such a situation, the capacity of the underused set of lines goes to waste. The requirement for dedicated hardware for interfacing with the PSTN translates into a further non-negligible expense for the enterprise.

The introduction of data network interfaces to remote offices and home offices enables remote enterprise workers and home users to communicate electronically with the enterprise and with other parties connected to the Internet. Such electronic communications may include store-and-forward messages (e.g., e-mail), real time one-way communications (e.g., live TV), real time two-way communications (e.g., Internet telephony, etc.).

Economical multiple-function peripheral devices suitable for remote office and home office use enable various combinations of print, copy, and scan-to-store functionality to end users. To keep these multiple-function peripheral devices affordable, manufacturers have relied on the processing capability and applications that operate on a local computing device and have not integrated simple mail transfer protocol functionality in these devices. Thus, an operating computing device has been required to receive and produce a hard copy of a facsimile message via these multiple-function peripheral devices.

Accordingly, it would be desirable to develop systems and methods that overcome these shortcomings in the integration and flexibility of fax functionality.

SUMMARY

Systems and methods that communicate documents to and from a multiple-function peripheral (MFP) via an autonomous application programming interface and a data network are invented and disclosed. The autonomous application programming interface enables the MFP to send and receive image information without a computing device. Received image information can be in the form of a stored fax intended for a user of the MFP. A fax is sent from the MFP as image information via a data network to a fax service. The fax service is configured to interpret information in the image information and deliver the same.

An embodiment of a multiple-function peripheral device comprises a packet-switched network interface communicatively coupled to a translator via a data network and an autonomous application programming interface configured to request image information from a remote server via the packet-switched network interface in a first mode of operation.

An embodiment of a method for processing documents includes the following steps: associating a destination identifier with a multiple-function peripheral device coupled to a data network, receiving a facsimile format message intended for the multiple-function peripheral device as defined by the destination identifier, storing the facsimile format message and upon receipt of a request from the multiple-function peripheral device, communicating the facsimile format message via commands in hypertext transfer protocol.

Another embodiment of a method for processing documents includes the following steps: registering a user of a multiple-function peripheral device, associating the user with an identifier that uniquely identifies the multiple-function peripheral device on a data network, accepting image information via commands in hypertext transfer protocol from the multiple-function peripheral device, converting the image information into a facsimile format message and communicating the facsimile format message.

Other devices, methods, features and advantages will be or will become apparent to one skilled in the art upon examination of the following figures and detailed description. All such additional devices, methods, features and advantages are defined and protected by the accompanying claims.

BRIEF DESCRIPTION OF THE DRAWINGS

The present systems and methods for communicating documents, as defined in the claims, can be better understood with reference to the following drawings. The components within the drawings are not necessarily to scale relative to each other; emphasis instead is placed upon clearly illustrating the elements, features and principles involved in supporting the transfer of documents to and receiving documents from a multiple-function peripheral device.

DETAILED DESCRIPTION

Figure 1:
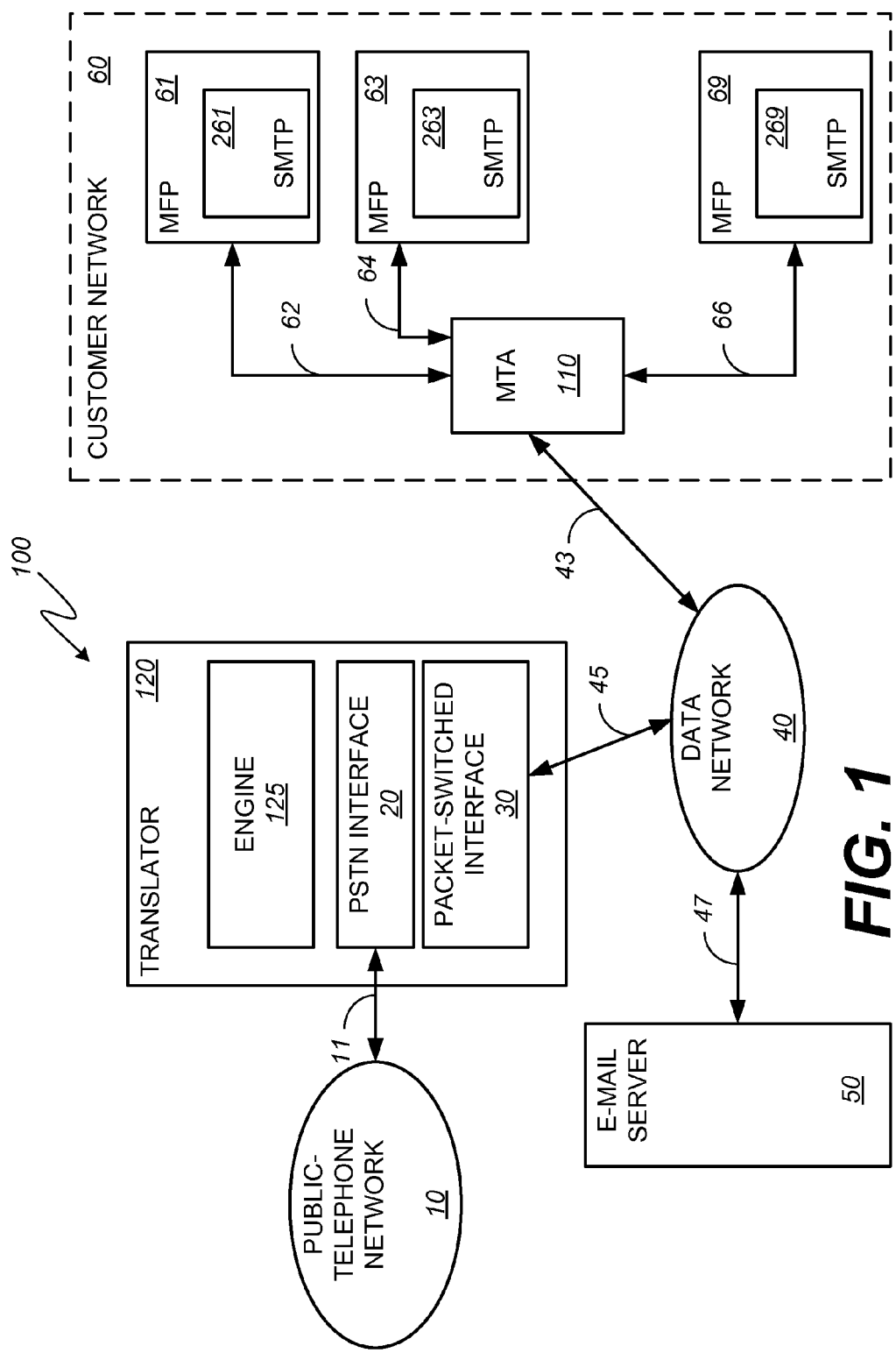
FIG. 1 is a functional block diagram illustrating an embodiment of an example network environment.

Systems and methods that communicate documents are invented and disclosed. A multiple-function peripheral (MFP) coupled to a data network in an enterprise environment sends and receives fax messages absent fax modems and the PSTN. Fax messages are received at a fax server or translator. The translator converts and appends the received PSTN facsimile to an image format file as an e-mail message or extracts the image format file information and appends the same in an e-mail attachment. Both tagged image file format (TIFF) and portable document format (PDF) are supported. In an alternative embodiment, the received fax is converted into commands using a printer command language (PCL). The PCL commands are directed to the destination MFP, which generates a hard-copy representation of the fax in accordance with the commands. The e-mail message with the attached fax message is forwarded via one of two methods. The methods are selectable depending on user preference.

The first method forwards the e-mail message from the translator to an e-mail server where the message is stored until application software operable on the destination MFP requests the stored e-mail message using an e-mail account assigned to the MFP. The application software receives the e-mail message with the attached fax, discards the e-mail message and prints the fax. In some embodiments, the MFP alerts a designated individual that a fax has been printed. Otherwise, the fax is available in the output bin for pickup and distribution to an addressee or for designated distribution.

The second method uses an e-mail delivery agent within the translator to forward the e-mail message to a message transfer agent (MTA). The e-mail delivery agent uses the destination phone number extracted from the PSTN fax to identify a destination domain. The e-mail delivery agent performs a domain name system (DNS) lookup for information associated with the identified destination domain. A mail exchange (MX) record provided by a client of a fax service is used to identify a mail server for processing the message. The MTA relays the e-mail message in accordance with the client's internal DNS mechanism. In one embodiment, a specific device name is used. In other embodiments, a client specific (internal) IP address is used to route the e-mail message to an SMTP server in the designated MFP. When more than one mail exchange record is included with the e-mail message, the mail exchange records can be prioritized with a preference number that indicates the order in which the MFPs should be used. This enables the use of primary and backup MFPs for processing the fax. Again, the MFP receives the e-mail message with the attached fax, discards the e-mail message and prints the fax. As described above, the MFP can be configured to alert a designated individual that a fax is available at the MFP. The designated individual need not be an addressee listed on the fax.

The MFP scans an outgoing document in fax emulation or local area network fax mode. The operator of the MFP enters a destination phone number just as with a fax machine. However, instead of using a fax modem and the PSTN at the customer premise to communicate the fax message to its intended recipient, the present system converts the scanned document into an image format file that is attached to an e-mail message addressed to a fax service or translator. Again, both TIFF and PDF are supported. No additional address information is required from the operator of the MFP. The MTA, which can be integrated in the MFP, or enabled in a local-area network coupled device can be configured to provide one or more encoded commands in the generated e-mail message. The MTA generates a source address in accordance with identifying information extracted from the MFP. The translator identifies and applies the encoded commands to the attachment to generate an outgoing fax. The outgoing fax is transmitted via the PSTN to the destination phone number. A delivery confirmation is returned to the sending or originating MFP via the e-mail server or MTA. The delivery confirmation may be sent as an e-mail message or as an attachment to an e-mail message.

In one embodiment, a user identifier is associated with the outgoing fax instead of or in addition to the MFP specific identifier. When this is the case, the system can use the user identifier when generating the fax coversheet and when returning a confirmation. In this embodiment, a fax confirmation can be forwarded to a particular user's e-mail account rather than or in addition to the MFP that was used to scan the document. A user identifier can be communicated to the MFP in multiple ways. For example, a card reader can be used to scan information available on an employee identification card, a radio frequency receiver can be used to scan radio-frequency identifiers from passive or active tags that can be incorporated in an employee identification card, or a user specific code can be entered via the user interface on the MFP. Preferably, the MFP or an external MTA will have a lookup table that can be used to determine the user of the MFP. The translator can use the user information to forward the confirmation message to the specified user.

In one embodiment, a MFP coupled to a data network in a small office or home environment sends and receives fax messages absent a fax modem, an external MTA, a computing device and the PSTN. A user of a network-based fax service shares personal information with a network-based service and receives a username and password. Fax messages are received on behalf of the user at a network-coupled fax server or translator. The translator converts and stores the received PSTN facsimile in an image format file, as a collection of print commands or as a page of information suitable for a browser application. The MFP uses an autonomous application programming interface to periodically request stored facsimile messages from the service. The service identifies and forwards any stored facsimile messages intended for the user associated with the username and password via the network directly to the MFP. In turn, the MFP generates a hard copy of the received facsimile messages. The MFP is further configured to scan and communicate a document for delivery in a facsimile format by the fax service.

An optional feature forwards a copy of facsimile format messages to an identified destination. The optional feature can be enabled at an enterprise level or a user level. The copy may be forwarded upon receipt by the fax service or concurrently or subsequent to delivery of the facsimile message to the MFP. The identified destination can be an email address, a fax address (i.e., a phone number) or a user list that associates both a destination email address and a fax address with an individual.

Having generally described operation of the systems and methods for communicating documents, various additional embodiments will be described with respect to FIGS. 1-9. FIG. 1 is a functional block diagram illustrating an embodiment of an example network environment. Network environment 100 includes PSTN 10, data network 40 and customer network 60. Translator 120 is coupled to PSTN 10 via link 11 and data network 40 via link 45. An e-mail server 50 is coupled to data network 40 via link 47. Customer network 60 is coupled to data network 40 via link 43.

E-mail server 50 is a data network coupled MTA or system of MTAs, used to route e-mail and serve e-mail, by storing e-mail messages and supporting customer access using post-office protocol (POP), internet message access protocol (IMAP) or other protocols.

Translator 120 includes PSTN interface 20, packet-switched interface 30 and engine 125. PSTN interface 20 makes the necessary data and signal translations to send and receive data including fax signal transmissions via PSTN 10. Similarly, packet-switched interface 30 makes the necessary data and signal translations to send and receive data packets via data network 40. Engine 125 includes a processor and memory (not shown) to enable processing of incoming and outgoing fax documents.

Customer network 60 includes MTA 110, MFP 61, MFP 63 and MFP 69. The number of MTAs and MFPs within customer network 60 may be expanded as desired to meet the fax communication and printing needs of the supported enterprise. MFP 61 is coupled to MTA 110 via link 62. MFP 63 is coupled to MTA 110 via link 64. MFP 69 is coupled to MTA 110 via link 66. In turn, MTA 110 is coupled to data network 40 via link 43. MTA 110 receives and relays incoming e-mail messages and associated attachments in accordance with the customer network's domain name system, which assigns an Internet protocol address to each physical device coupled to customer network 60. In addition, MTA 110 generates an e-mail message with an image format file attachment and forwards the e-mail message in accordance with the phone number entered by a user of one of MFP 61, MFP 63 and MFP 69. MTA 110 will include one or both of an MFP identifier and a user identifier in the generated e-mail message.

It is important to note that the network environment 100 illustrated in FIG. 1 is not the only contemplated embodiment. For example, either or both of the translator 120 and the e-mail server 50 may be implemented within and under the management and control of customer network 60. In addition, a single MTA 110 is illustrated in communication with MFP 61, MFP 63 and MFP 69 within customer network 60. Alternatively, the MTA functionality can be implemented within application software and/or firmware operable within each of MFP 61, MFP 63 and MFP 69 such as with SMTP server 261, SMTP server 262 and SMTP server 269. It should be further understood that each of the illustrated communication links with data network 40, such as link 43, link 45 and link 47 or internal links within customer network 60, such as link 62, link 64 and link 66 may be partially or entirely enabled wirelessly.

Figure 2:
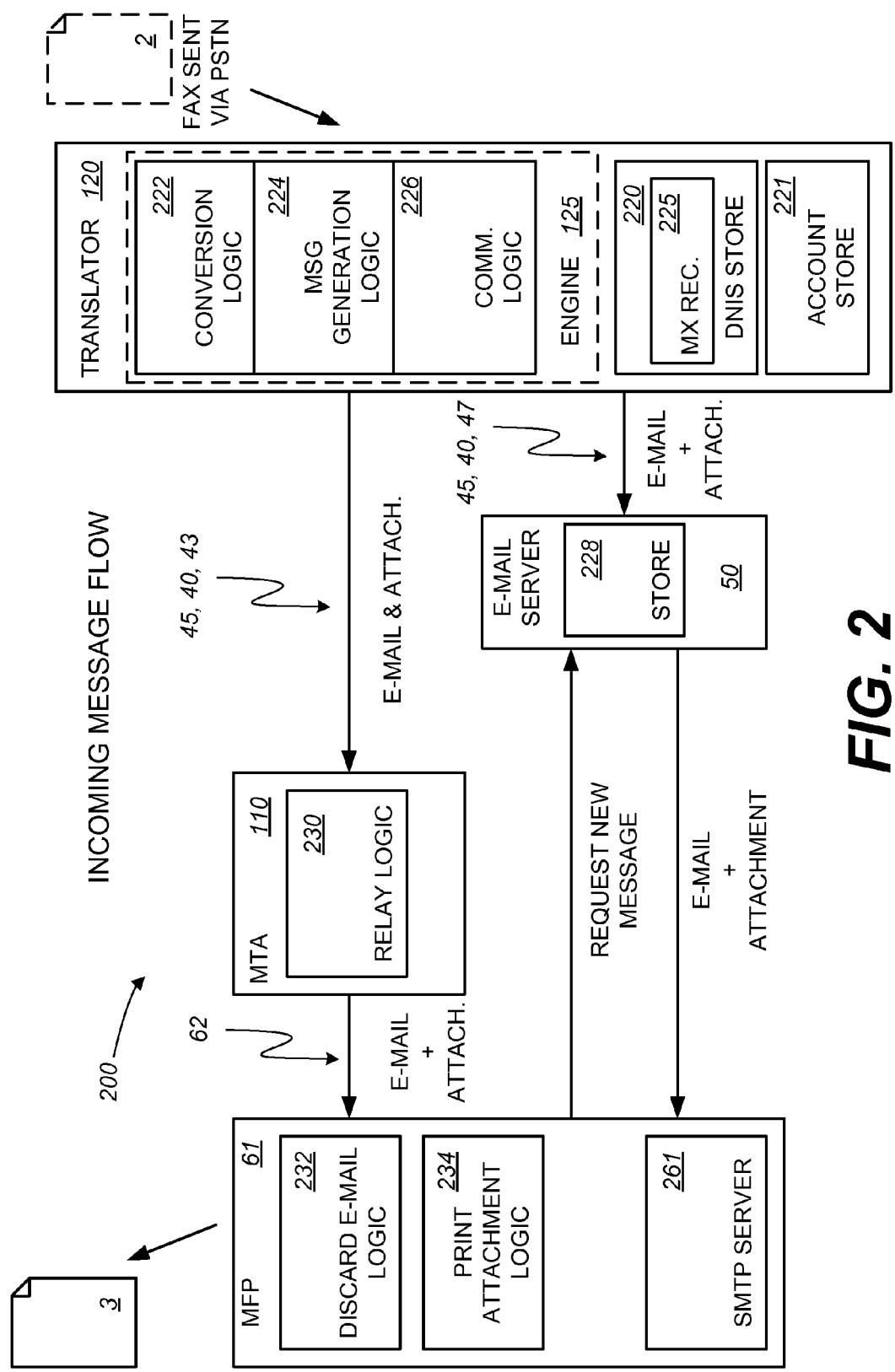
FIG. 2 is a functional block diagram illustrating inbound fax message processing through the network environment of FIG. 1.

FIG. 2 is a functional block diagram illustrating inbound fax message processing through the network environment 100 of FIG. 1. Diagram 200 illustrates the processing of an incoming fax message from right to left across the figure. As shown in FIG. 2, fax message 2 is received by translator 120, which generates an e-mail message and translates the fax format message into an image format file attachment. The generated e-mail message with the attachment is communicated to MTA 110 or e-mail server 50, which forward the e-mail message and the attachment to the designated MFP (e.g., MFP 61). In turn, MFP 61 generates a hard copy representation 3 of the fax message 2 from the received attachment. As described above, the attachment includes one or more files in PDF or TIFF. Alternatively, the attachment includes PCL commands that instruct the MFP in rendering a representation of the inbound fax.

Engine 125 includes software and or firmware that detects and processes a received fax message. That is, engine 125 includes conversion logic 222, message generation logic 224 and communication logic 226. Conversion logic 222 is configured to convert the fax format message into an image format file. In this regard, conversion logic 222 can be configured to convert the fax into a TIFF or a PDF file. Message generation logic 224 is configured to generate an e-mail message addressed to the intended recipient of the fax message and attach the image format file. Message generation logic 224 uses information from dialed number identification service (DNIS) store 220 as well as account store 221 to address the message. DNIS store 220 includes information that is used by the message generation logic 224 to direct an inbound fax message to the appropriate e-mail address. In the illustrated embodiment, a client generated MX record 225 includes information that can be used to direct the e-mail message either to e-mail server 50 or to MTA 110. Account store 221 includes a unique phone number and e-mail address for each MFP (e.g., MFP 61) in the system. Communication logic 226 forwards an appropriately configured e-mail message and the attachment to MTA 110 via link 45, link 40 and link 43. Alternatively, communication logic 226 sends the e-mail message and the attachment to an e-mail account enabled by e-mail server 50 via link 45, link 40 and link 47.

When the MTA 110 receives the e-mail message and attachment, relay logic 230 interprets the name of the destination MFP and uses a local DNS mechanism to identify the local IP address. Once, the local IP address is identified, MTA 110 forwards the e-mail message and attachment accordingly. In the illustrated embodiment, the e-mail message and the attachment are designated for delivery to MFP 61 via link 62. Otherwise, in accordance with a configured parameter, SMTP server 261, operable on the MFP 61, periodically sends a request to e-mail server 50 to forward e-mail messages in store 280 that are addressed to MFP 61. In response, e-mail server 50 forwards the appropriately addressed e-mail messages from store 228, along with their attachments to SMTP server 261.

In addition to SMTP server 261, MFP 61 includes software and or firmware that processes a received e-mail message. That is, MFP 61 includes discard e-mail logic 232 and print attachment logic 234. Discard e-mail logic 232 strips the attachment from its host e-mail message. Print attachment logic 234 renders the information in the image format file into a hard-copy representation 3 of the received fax message 2.

Figure 3:
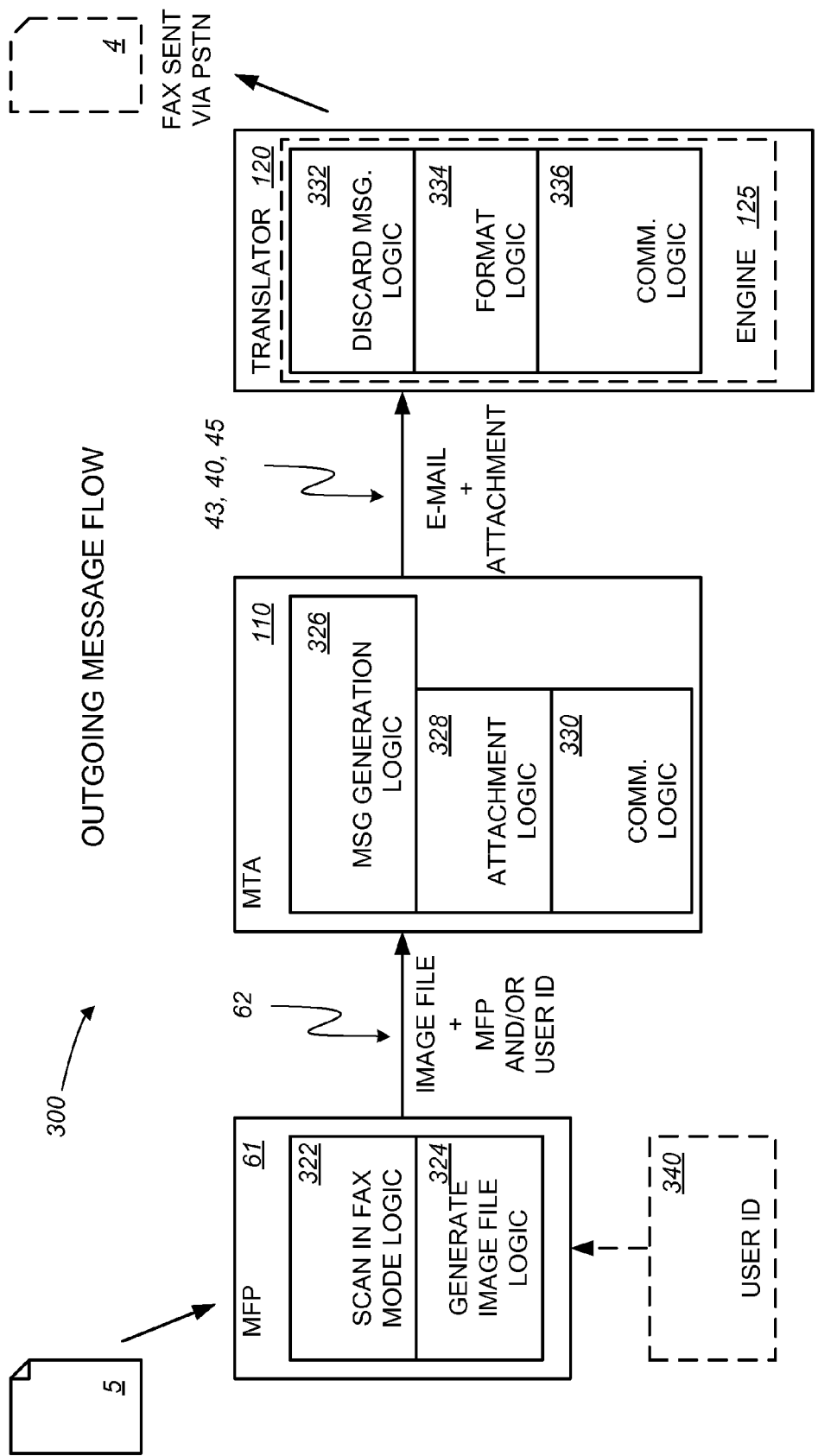
FIG. 3 is a functional block diagram illustrating outbound fax message processing through the network environment of FIG. 1.

FIG. 3 is a functional block diagram illustrating outbound fax message processing through the network environment 100 of FIG. 1. Diagram 300 illustrates the processing of an outbound fax message from left to right across the figure. As shown in FIG. 3, source document 5 is received by MFP 61, which scans the document in fax mode and generates an image file. The image file and identifying information are communicated to MTA 110. In turn, MTA 110 receives the image file and identifying information and generates an e-mail message with an attachment, which is communicated to translator 120 for further processing. Translator 120 received the e-mail message and translates the image format file into a fax format information stream. Additional logic in translator 120 determines whether a cover sheet should be added and in accordance with a previously store configuration or encoded commands in the e-mail message formats the cover sheet. Thereafter, the fax format information stream and any cover sheet information is communicated via PSTN 10 to deliver fax message 2 to the intended fax device.

MFP 61 includes software and or firmware that processes a document. That is, MFP 61 includes scan in fax mode logic 322 and generate image file logic 324. Scan in fax mode logic 322 receives a destination phone number and captures an image of each page of the document 5. Generate image file logic 324 converts the captured image into a image format file. As further illustrated in FIG. 3, MFP 61 can be configured to receive user identifier 340. As described above, a user identifier can be communicated by any number of various mechanisms. The user identifier can be entered via a user interface on MFP 61. The user identifier can be received via a passive or active radio-frequency identification tag worn or otherwise attached to an operator of the MFP 61. In addition, the user identifier can be received from a badge scanner coupled to the MFP 61. Regardless of the mechanism for communicating the user identifier, MFP 61 communicates the image file and the MFP identifier and/or user identifier via link 62 to MTA 110.

MTA 110 includes software or firmware that further processes a document. In this regard, MTA 110 includes message generation logic 326, attachment logic 328 and communication logic 330. Message generation logic 326 creates an e-mail message. The e-mail message includes a "to" field entry with the destination phone number inserted as a prefix concatenated to a server name and an extension of an e-mail account associated with translator 120. Attachment logic 328 appends or otherwise associates the image file as an attachment to the created e-mail message. Communication logic 330 sends the generated e-mail message and the attachment to translator 120 via link 43, link 40, and link 45.

Engine 125 within translator 120 includes software and or firmware that detects and processes a received e-mail message. That is, engine 125 includes discard message logic 332, format logic 334 and communication logic 226. Discard message logic 332 removes the attachment from the received e-mail message. Format logic 334, in accordance with one or more encoded commands in the e-mail message adds and appropriately formats a cover sheet to be sent with the fax message. Communication logic 226 forwards appropriately translated fax format information via PSTN 10 to the destination phone number.

Figure 4:
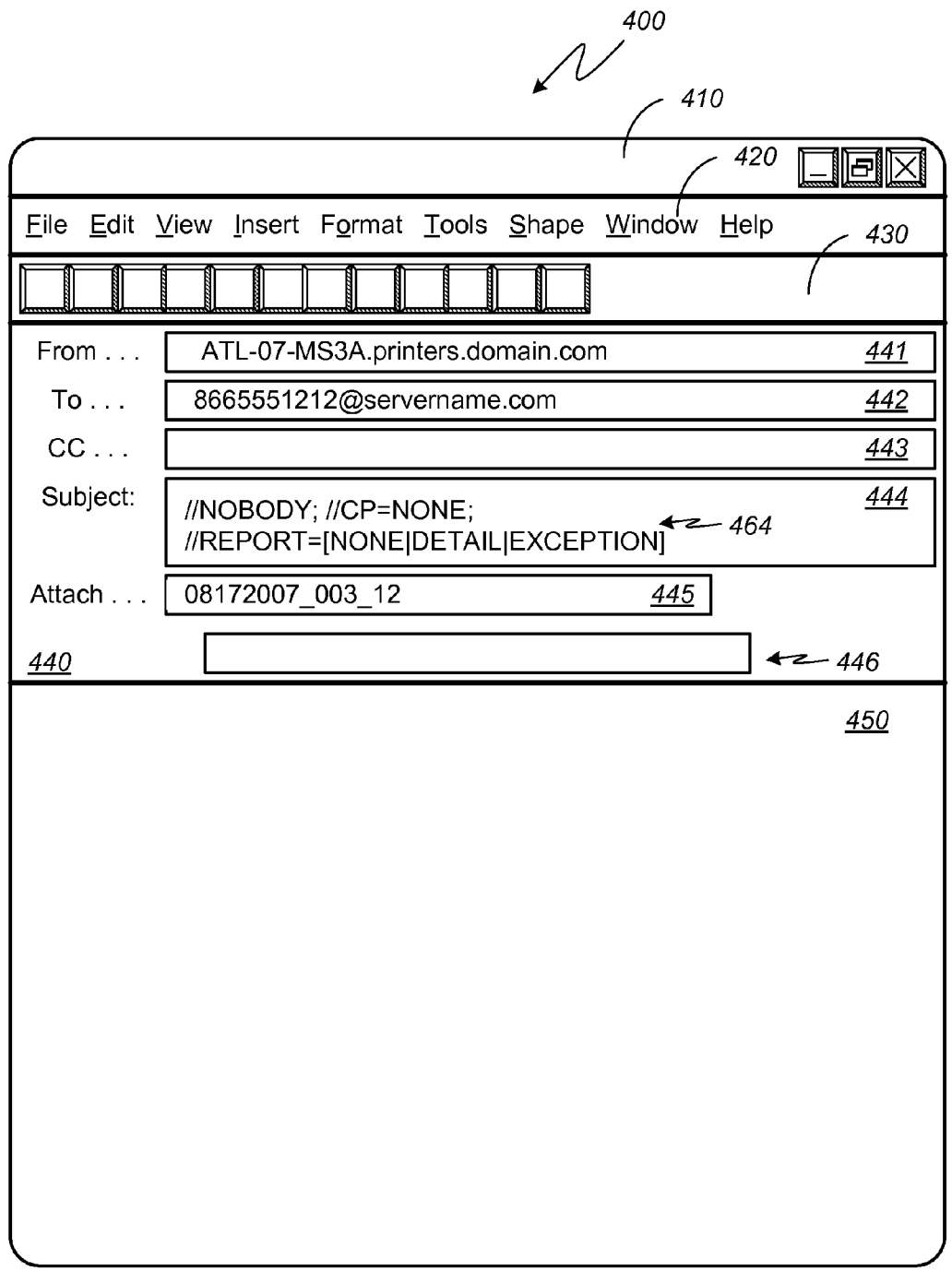
FIG. 4 is a functional block diagram illustrating an embodiment of an e-mail message.

FIG. 4 is a schematic diagram illustrating an embodiment of an example e-mail message 400 as rendered on a display device. The e-mail message 400 includes title bar 410, drop-down-menu bar 420, task bar 430, header 440, and body 450. Title bar 410 is arranged across the top of message 400. Title bar 410 includes pushbuttons arranged left-to-right that when selected minimize, resize, and close the message application window, respectively. Title bar 410 may include an alphanumeric title (not shown) to identify the e-mail message from other e-mail messages. Drop-down menu bar 420 includes a set of alphanumeric titles for respective drop-down menus commonly available in graphical user interfaces.

Task bar 430 includes a set of pushbuttons arranged left-to-right that when selected perform a respective operational task, open a tool, configure various application parameters, etc. As is known, each of the pushbuttons may be labeled with an icon indicative of the associated operation, tool, or configuration item to be manipulated.

Header 440 includes a set of data entry fields and a configuration or edit panel. Specifically, header 440 includes "from" field 441, "to" field 442, "CC" field 443, "subject" field 444 and "attachment" field 445. Each of "from" field 441, "to" field 442, "CC" field 443, "subject" field 444 and "attachment" field 445 are configured to receive and/or display alphanumeric strings. "From" field 441 is arranged to receive and display a first alphanumeric string that identifies the source of the message in message body 450. "To" field 442 is arranged to receive and display a second alphanumeric string that identifies an intended destination for the message in message body 250. "CC" field 443 is arranged to receive and display a third alphanumeric string that identifies additional parties or destinations that are to receive a copy of the message in message body 250. "Subject" field 444 is arranged to receive and display a fourth alphanumeric string that discloses what the message in message body 450 concerns. "Attachment" field 445 is arranged to receive and display a fifth alphanumeric string that includes a filename of one or more files attached to the e-mail message 400. Header 440 further includes task/configuration bar 446, which includes a set of pushbuttons labeled with icons indicative of an associated task that is performed when the pushbutton is active and selected. For example, task/configuration bar 446 may include pushbuttons associated with print, save, edit (including cut, copy and paste selected text strings) and formatting tasks.

In the illustrated embodiment, "from" field 441 includes a string of sub-strings separated by three instances of a period. The first sub-string, "ATL-07-MS3A," identifies the location of the source MFP that generated the e-mail message. The second sub-string, "printers," indicates that the MFP is capable of printing files and is coupled to the customer network 60 (FIG. 1). The third sub-string, "domain," indicates the name of the customer's network domain. The fourth sub-string, "com" reveals the extension of the address of the MFP. The "to" field includes a string of sub-strings identifying an e-mail address. The first sub-string, "8665551212," includes the destination phone number associated with the intended recipient of the fax message. The second sub-string, "server-name," reveals the domain name of the translator that will process the message. The third sub-string, "com" reveals the extension of the address associated with the translator 120. The "attachment" field 445 includes a string that represents the filename of the file attached to the e-mail message. The illustrated filename indicates that the file was generated on Aug. 17, 2007. The file was generated as the result of the third scanned document processed on that day and includes 12 pages.

"Subject" field 444 includes three strings separated by semicolons. The first of the strings, "//NOBODY" is a command that directs the translator 120 to ignore any information in the body 450 of e-mail message 400. The second string, "//CP=NONE," is a command that directs the translator 120 to omit a coversheet from the outgoing fax message. The third string, "//REPORT=[NONE|DETAIL|EXCEPTION]," is used to direct the translator 120 how to report fax delivery. Additional and alternative encoded instructions can be easily enabled to instruct the translator 120 to use information in the body 450 to generate and format a cover sheet to be inserted into the outgoing fax message.

Generally, in terms of hardware architecture, the above-described MTA 110, translator 120 and SMTP server 261 each include respective processors and memories, as well as local and external interfaces. Each respective combination is arranged such that the processor is in communication with the memory via the local interface. The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, power and/or data connections to enable appropriate communications among the aforementioned components.

The respective processors are hardware devices for executing software, particularly that stored in the associated memory devices. The processors can be any custom made or commercially available processor configured to execute software instructions.

The respective memories can include any one or a combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM), hard drive, tape, compact disk read-only memory (CD-ROM), etc.). Moreover, the respective memories may incorporate electronic, magnetic, optical, and/or other types of storage media. Each memory can have a distributed architecture, where various components are situated remote from one another, but still accessible via the associated processor.

One or more programs, each of which comprises an ordered listing of executable instructions for implementing logical functions can be stored in the respective memories. In addition, each of the memories may include an operating system that essentially controls the execution of the illustrated functions and perhaps additional functions such as scheduling, input-output control, file and data management, memory management, communication control and related services.

When implemented as source programs, the programs are translated via a compiler, assembler, interpreter, or the like, to operate properly in connection with the operating system.

The external interfaces perform signal conditioning and data format conversions to enable communication through one or both of wired and wireless networks. Wired interfaces are compatible with Ethernet standards and TCP/IP. Wireless interfaces are compatible with one or more of the infrared data association (IrDA) and the Institute of Electrical and Electronics Engineers (I.E.E.E.) 802 family of wireless data communication protocols. It should be understood that other data-network interfaces compatible with other communication standards and protocols may also be used.

Additional interfaces and mechanisms can be coupled to each of the MTA 110, translator 120, and SMTP server 261 to configure these devices. These mechanisms may include browsers or other software (not shown) configured to expose configuration parameters, data tables and other information to external devices. Moreover, the local interface can be configured with one or more man-machine interfaces such as a keyboard, a display, a printer, etc. Such human-machine interfaces may include touch sensitive displays or the combination of a graphical-user interface and a controllable pointing device such as a mouse to enable an operator to configure or otherwise modify MTA 110, translator 120 or SMTP server 261 gateway 121 and gateway 122.

When instructions and data elements are implemented in software it should be noted that these software elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where one or more of instructions operable within MTA 110, translator 120 and SMTP server 261 are implemented in hardware, the instructions can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), etc.

Figure 5:
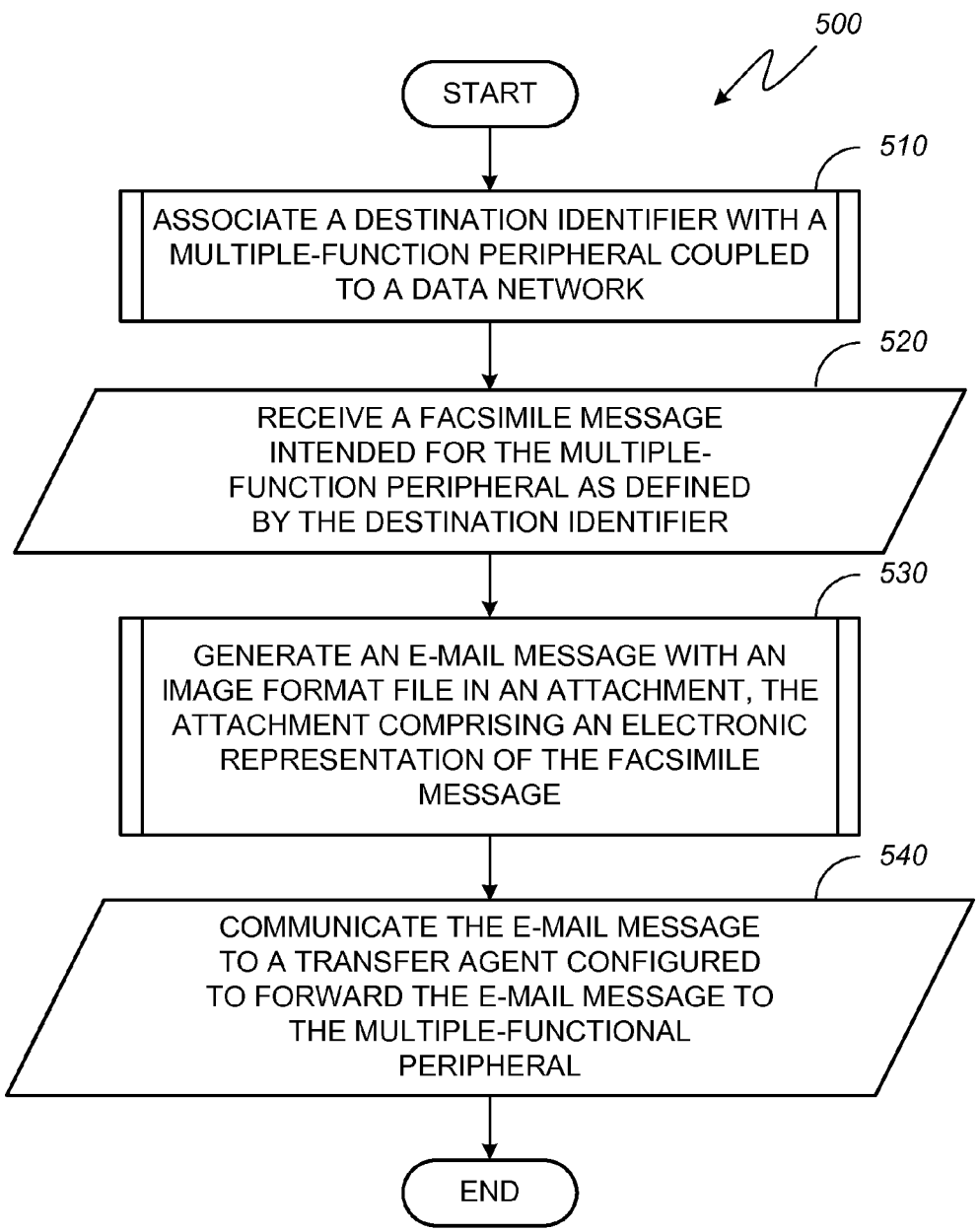
FIG. 5 is a flow diagram illustrating an embodiment of a method for communicating documents.

FIG. 5 is a flow diagram illustrating an embodiment of a method for communicating documents. The flow diagram of FIG. 5 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 500 begins with block 502 where a destination identifier is associated with a specific MFP coupled to a data network. Thereafter, as shown in input/output block 520, a fax message intended for the MFP as defined by the destination identifier is received. Upon receipt of the fax, an e-mail message is generated with an image format file attachment as shown in block 530. As further indicated in block 530 the attachment includes an electronic representation of the fax message. Next, as shown in input/output block 540, the e-mail message is communicated to a transfer agent configured to forward or relay the e-mail message to the MFP.

Figure 6:
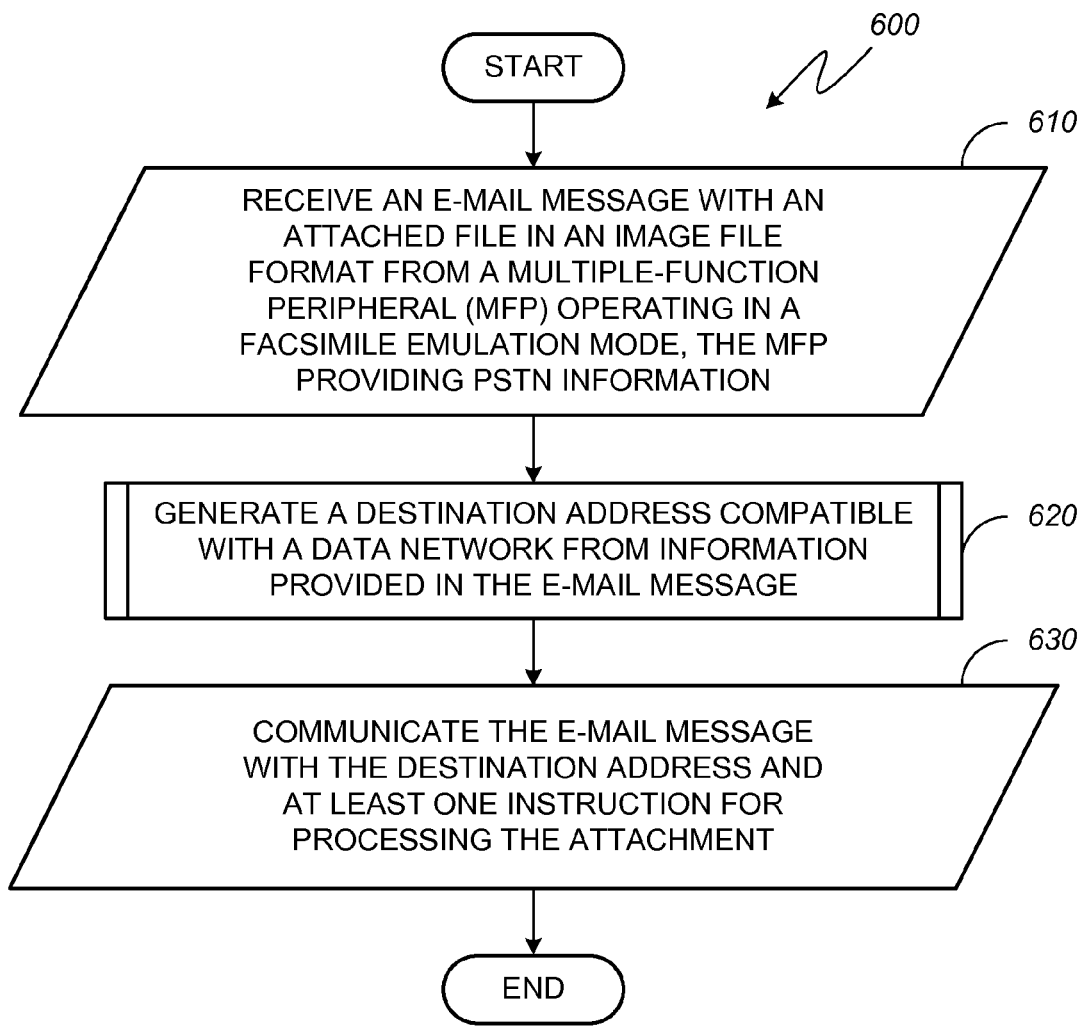
FIG. 6 is a flow diagram illustrating an embodiment of a method for processing documents.

FIG. 6 is a flow diagram illustrating an embodiment of a method for processing documents. The flow diagram of FIG. 6 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 600 begins with input/output block 610 where an e-mail message including an attachment in an image file format is received from a MFP operating in facsimile mode, the MFP providing PSTN information in the e-mail message. Thereafter, as shown in block 620, a destination address compatible with a data network is generated in accordance with information provided in the e-mail message. Next, as shown in input/output block 630, the e-mail message is communicated along with the destination address and at least one instruction for processing the attachment.

Figure 7:
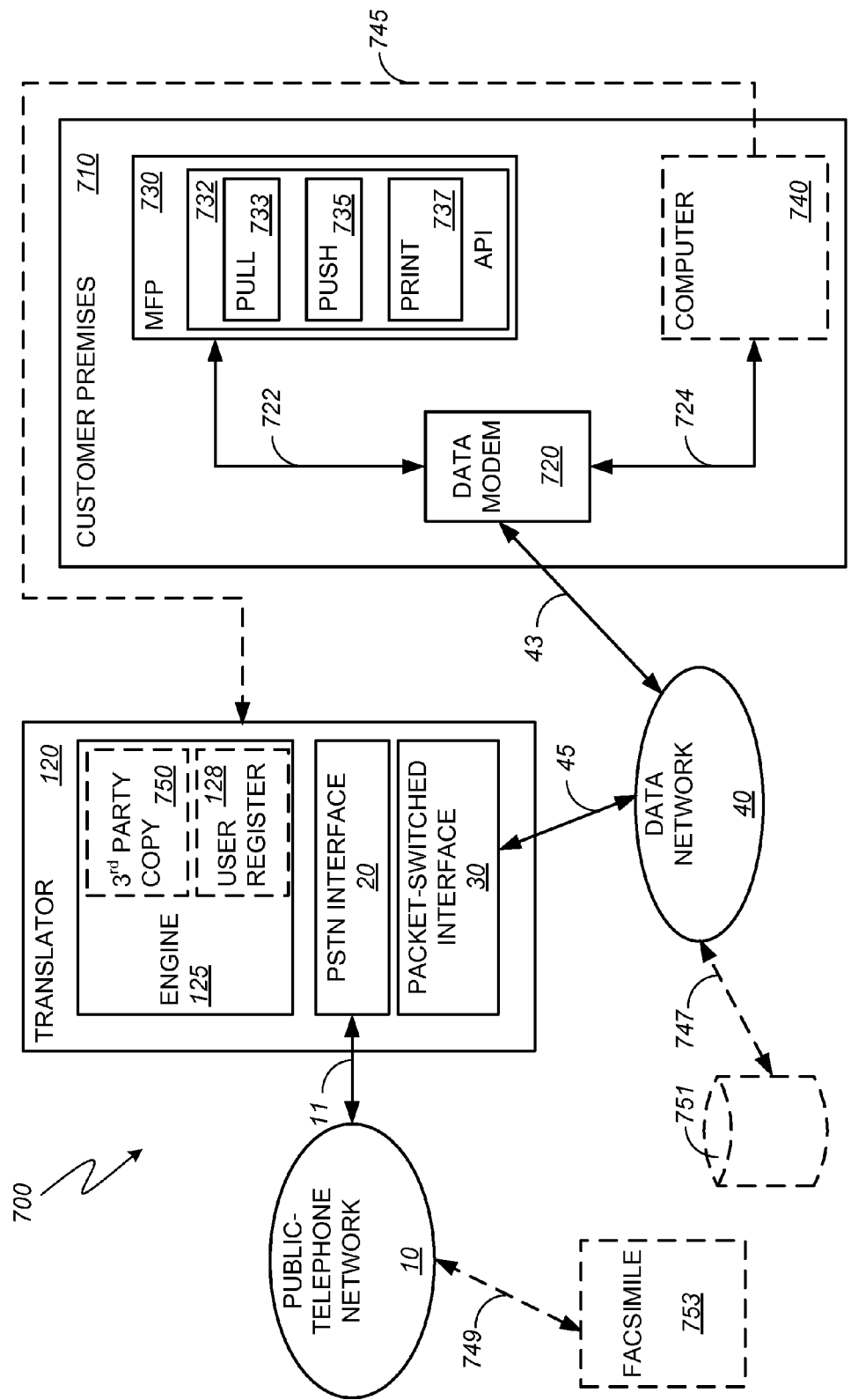
FIG. 7 is a functional block diagram illustrating an embodiment of an alternative network environment.

FIG. 7 is a functional block diagram illustrating an embodiment of an alternative network environment. Network environment 700 includes PSTN 10, data network 40 and customer premises 710. Translator 120 is coupled to PSTN 10 via link 11 and data network 40 via link 45. Customer premises 710 is coupled to the data network 40 via link 43.

Translator 120 includes PSTN interface 20, packet-switched interface 30 and engine 125. PSTN interface 20 makes the necessary data and signal translations to send and receive data including fax signal transmissions via the PSTN 10. Similarly, packet-switched interface 30 makes the necessary data and signal translations to send and receive data packets via the data network 40. Engine 125 includes a processor and memory (not shown) to enable processing of incoming and outgoing fax documents. Engine 125 receives or is otherwise in communication with a user register 128, which stores personal information about the user(s) of equipment within customer premises 710. The user register 128 may include account information, including names, usernames, and one or more identifiers that uniquely identify the MFP 730. Engine 125 further includes logic located within the $3^{rd}$ party copy generator 750 that when executed by the processor enables the optional transfer of an additional copy of messages to and from the customer premises 710 to a predetermined or second destination. The second destination can be an email address or a facsimile address. When the second destination is an email address, the message may be sent via communication link 747 to data store 751, which holds, indexes, and exposes the stored copies. When the second destination is a phone number, the message may be sent via communication link 749 to a facsimile device 753.

The customer premises 710 include a data modem 720 and the MFP 730. The customer premises 710 may at times include an operational computer 740. Data modem 720 provides the necessary data and signal translations to send and receive data packets between the customer premises 710 and devices coupled to the data network 40. The data modem is coupled to the MFP 730 via link 722 and to the computer 740 via link 724. Each of the illustrated communication links with data network 40, such as link 43 or link 45 or internal links within customer premises 710, such as link 722 or 724 may be partially or entirely enabled wirelessly.

The MFP 730 includes an autonomous application programming interface (API) 732. The API 732 includes one or more Internet services that permit a user of a coupled computing device with a browser application to communicate with the MFP 730. The Internet services may include status information such as a device name, a system name, firmware identifiers, an IP address and a media access control address among other information. The Internet services may further include status information concerning packets transmitted, received, transmission errors, device on/off status, and diagnostics etc. In addition, the API 732 includes a pull function 733, a push function 735 and a print control interface 737. The pull function 733 periodically communicates with the translator 120 via data modem 720, link 43, data network 40 and link 45 to retrieve previously stored facsimile format messages. A delay period between communication sessions with the translator 120 may be user configured via a registration and configuration process shown by link 745. The pull function 733 receives the necessary information to reproduce the facsimile message. The pull function 733 forwards the received information to the print control interface 737, which uses the print engine in the MFP 730 to produce a hard copy representation of the facsimile message(s). The push function 735 communicates with the translator 120 when an operator of the MFP has supplied a document to be communicated via the translator 120 in a facsimile format to a device coupled to the PSTN 10 and associated with a destination identifier (i.e., a phone number).

Link 745, couples the computer 740 to the user register 128 enabling a user to register or subscribe to a communication service. Computer 740 is shown within customer premises 710 in the example embodiment. It should be understood that a user or others associated with a user of the communication service could use a computing device or other interface located in other locations remote from customer premises 710 to communicate with engine 125 via data network 40 or PSTN 10 to register the user and configure a suitable user profile. It should be further understood that once registered and configured, the computer 740 is no longer needed to communicate facsimile messages.

The particular content of the message information in the additional copy depends on whether the original message was an inbound message or an outbound message. Inbound messages are those that are sent via facsimile from PSTN 10 to customer premises 710 via the translator 120. Outbound messages are those that originate as an image scanned or otherwise generated at the MFP 730 and that are sent via email from the customer premises 710 to an intended recipient via the translator 120 and one or more of the PSTN 10 and the data network 40.

When the message is an inbound message, the document (i.e., the copy) provided by the $3^{rd}$ party copy generator 750 includes the name of the user, a facsimile number associated with the user, the ANI of the received facsimile message as well as the date and time that the facsimile was received. Both the user and the facsimile number associated with the user are retrieved from the user's profile. It should be understood that additional data elements which may be found in a facsimile header or a document processing header are also available for inclusion in the message sent to a $3^{rd}$ party associated with the second identifier.

When the user's profile indicates a desire for inbound messages to be sent via email, an email message containing a copy of the information in the inbound facsimile message will include a message body and an attachment. The attachment will include a copy of the inbound facsimile in a format also specified in the user's profile. The body of the email message sent to the $3^{rd}$ party will be customizable. A default version of the email message will include the email address of the recipient of the copy, an indication that the copy was sent from the service provider, as well as an indication of the recipient of the original facsimile message. The email message may also include a notice that the attached document was received by <customer name> at <customer's inbound facsimile number>, as well as a note identifying the ANI of the originator, the date, the time, and the number of pages received.

When the user's profile indicates a desire for inbound messages to be sent via facsimile, a facsimile message containing a copy of the information in the inbound facsimile will be preceded by a customizable cover page. A default version of the facsimile cover page will include the facsimile number of the recipient of the copy, an indication that the copy was sent from the service provider. The facsimile message may also include a notice that the attached document was received by <customer name> at <customer's inbound facsimile number>, as well as a note identifying the ANI of the originator, the date, the time, and the number of pages received.

When the message is an outbound message, the document (i.e., the copy) provided by the $3^{rd}$ party copy generator 750 includes the name of the user, the from address on the message, the destination address(es) from the message, the text contained in the message body, the subject line, as well as the date and time that the message was received. Both the user and an address associated with the originating user are retrieved from the user's profile.

When the user's profile indicates a desire for outbound messages to be sent via email, an email message containing a copy of the information in the outbound message will include a message body and at least one attachment. The attachment(s) will be copies of the attachment(s) contained in the original message. The body of the email message sent to the $3^{rd}$ party will be customizable. A default version of the email message will include the email address of the recipient of the copy, an indication that the copy was sent from the service provider, as well as an indication of the source of the original message. The email message may also include a notice that the attached document was sent by <customer name> at <customer's from address>, to <list of destination addresses> as well as a note identifying the date, the time, the number of pages in each attachment, a subject line populated from the subject line of the outbound message (if any) as well as any text from the body of the outgoing message.

When the user's profile indicates a desire for outbound messages to be sent via facsimile, a facsimile message containing a copy of the information in the outbound facsimile will be preceded by a customizable cover page. A default version of the facsimile cover page will include the facsimile number of the recipient of the copy, an indication that the copy was sent from the service provider, the delivery date, number of pages, and a note that the message is from the user. The facsimile message may also include a notice that the attached document was sent by <customer name> at <customer's email address>, to a <list of destination addresses>, as well as a note identifying the date, the time, the number of pages in each attachment, a subject line and a body.

As indicated above, the $3^{rd}$ party copy will be enabled via individual user preferences stored in a user's profile. The profile can be enabled at an enterprise or group level as well as an individual user level. Individual profile elements will specify both the drop location and address type for the $3^{rd}$ party copy. The presence of a complete and properly formatted delivery address or second identifier and address type will enable the $3^{rd}$ party copy generator 750 to provide the above-described features. It is anticipated that access to these profile elements may be restricted to administrators of the service or customer employees/agents with suitable privileges.

The $3^{rd}$ party copy generator 750 is configured to mark or otherwise designate copied messages for a copied message billing rate that may differ from the rate or rates applied to other messages processed by the translator 120.

Figure 8:
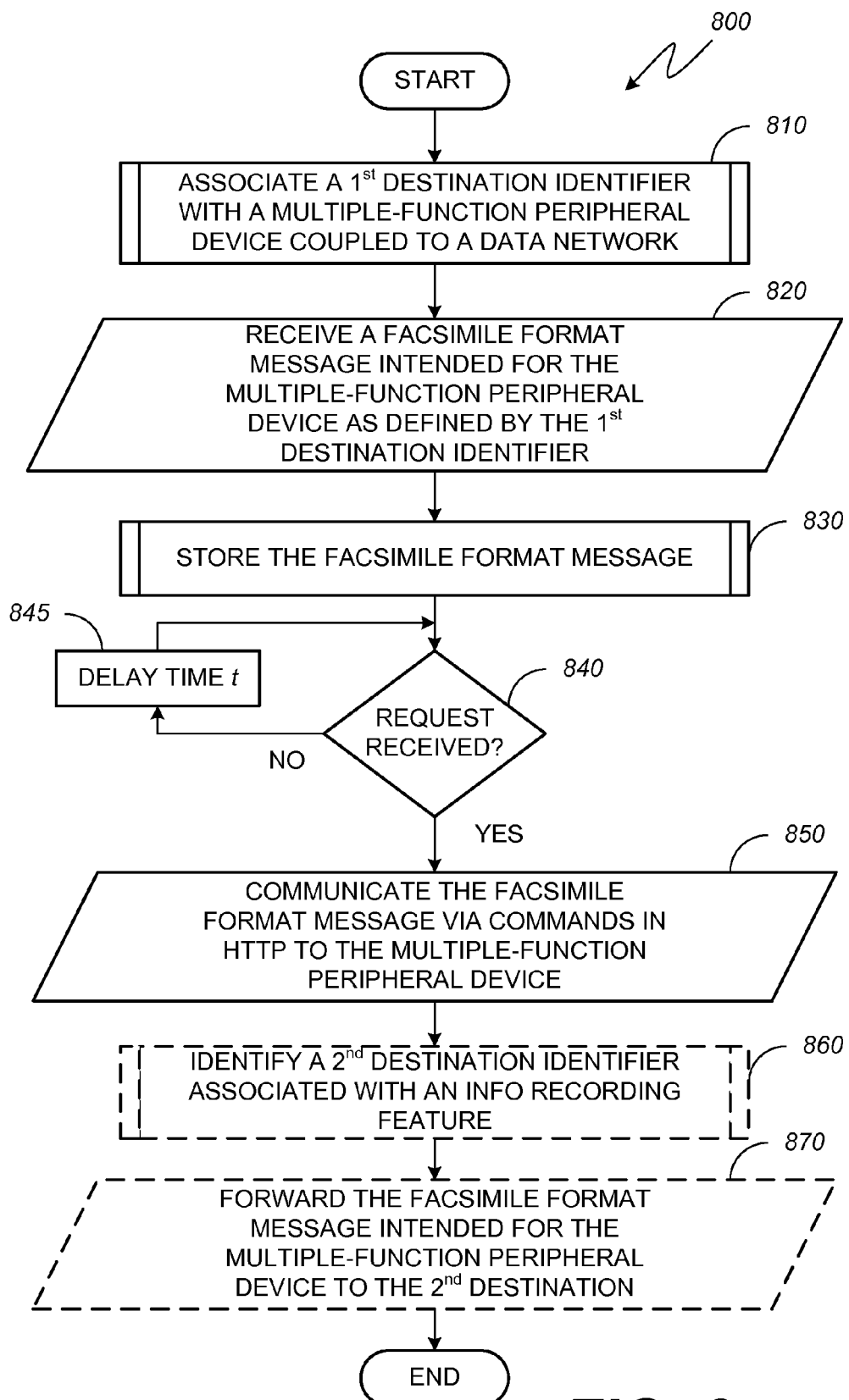
FIG. 8 is a flow diagram illustrating an embodiment of a method for processing documents.

FIG. 8 is a flow diagram illustrating an embodiment of a method for processing documents. The flow diagram of FIG. 8 shows the architecture, functionality, and operation of a possible implementation via software and or firmware associated with communicatively coupled devices. In this regard, each block represents a module, segment, or portion of code, which comprises one or more executable instructions for implementing the specified function(s).

The method 800 begins with block 810 where a service associates a destination identifier with a multiple-function peripheral device coupled to a data network. The destination identifier can include a media access control address, an IP address, a hostname, etc. The service will have stored information concerning the location or owner of the MFP. Thereafter, as shown in input/output block 820, the service receives a facsimile format message intended for the MFP device as defined by one or more destination identifiers. Next, the service stores the received facsimile format message as indicated in block 830. The service may convert the received facsimile format message into a stream of printer commands or a browser page that is buffered or otherwise stored in a data store under the control of the service. In decision block 840, the service determines if a request has been received from the MFP device. When a request has not been received, as indicated by the flow control arrow labeled "NO," processing returns to decision block 840 after a service configurable wait or delay time t in block 845. When a request has been received from the MFP, as indicated by the flow control arrow labeled "YES," the service communicates the previously stored and perhaps converted facsimile format message via commands in hypertext transfer protocol via a secure sockets layer to the MFP device.

In an alternative and optional mode of operation, a second destination identifier associated with an information recording feature is identified, as indicated in optional block 860. As described above, the second destination can be identified via one or more of an email address, a facsimile address (i.e., a phone number) or a list address. A list address includes a name along with one of the email address, the facsimile address or both addresses. When a list address is used to identify the second destination, a user name and a code identifying a select priority for delivering a copy of the image information from the MFP device as stored in a profile are used to control delivery of the copy.

Once the second identifier has been identified in block 860, the facsimile format message intended for the MFP device is forwarded to the second destination in accordance with the profile information associated with the MFP device that generated the message, as shown in I/O block 870. The copy of the message intended for the user associated with the MFP device may be stored, indexed and made available in accordance with one or more compliance standards for recording communications.

Figure 9:
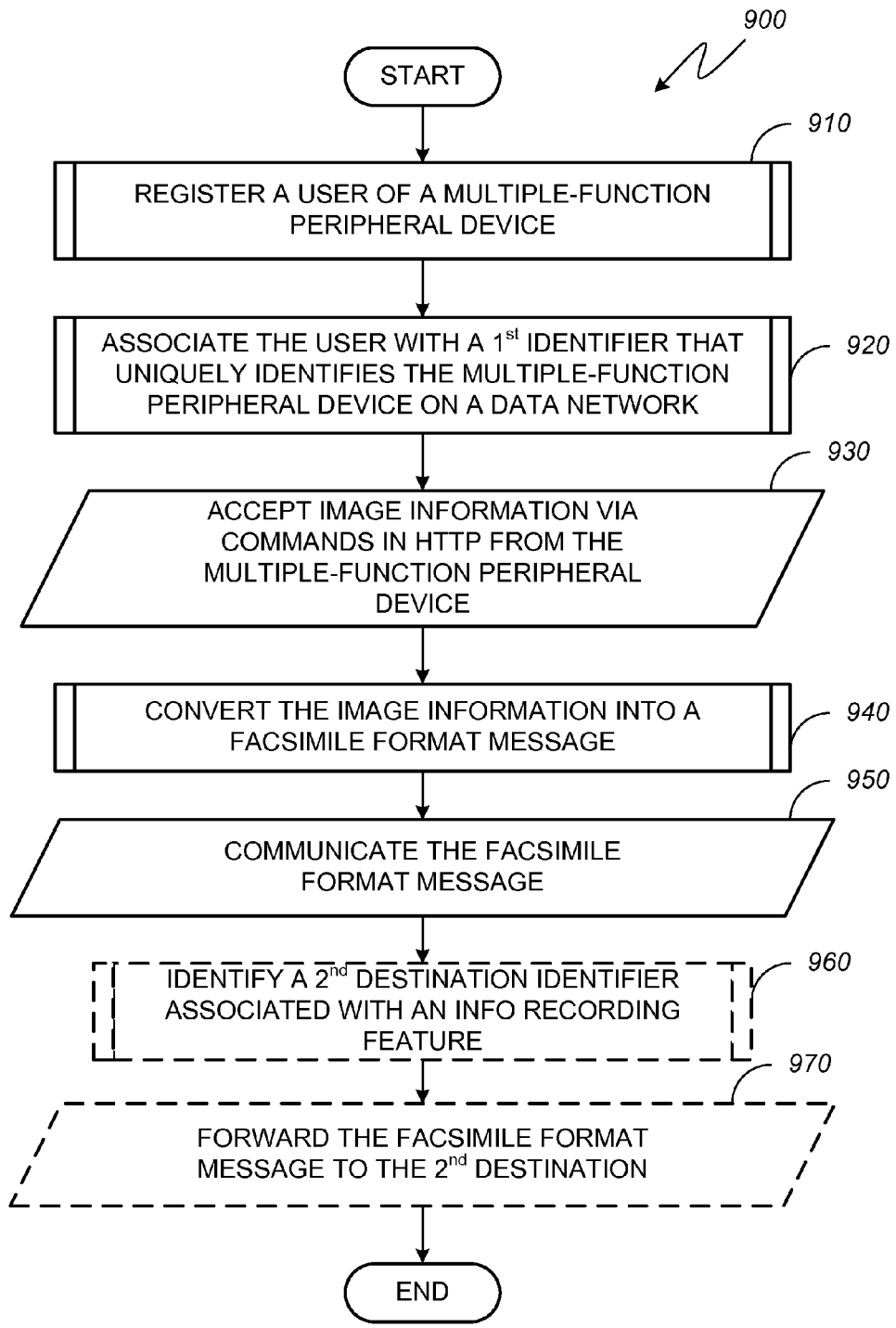
FIG. 9 is a flow diagram illustrating an embodiment of a method for communicating documents.

FIG. 9 is a flow diagram illustrating an embodiment of a method for communicating documents. The flow diagram of FIG. 9 shows the architecture, functionality, and operation of a possible implementation via software and or firmware associated with communicatively coupled devices. In this regard, each block represents a module, segment, or portion of code, which comprises one or more executable instructions for implementing the specified function(s).

The method 900 begins with block 910 where a service registers a user of a MFP device that is directly accessible via a data network. As part of a registration process, the service collects and stores information concerning the network location, type, model or other information concerning the MFP device and/or its user(s). In block 920, the service associates the user with a first identifier that uniquely identifies the MFP device on a data network. The first identifier can include a media access control address, an IP address, a hostname, etc. Thereafter, as shown in input/output block 930, the service accepts image information via commands in hypertext transfer protocol via a secure sockets layer from the MFP device. Next, as shown in block 940 the service converts the image information into a facsimile format message. After conversion into a facsimile format message, the service communicates the message as shown in input/output block 950. The service communicates the facsimile to a destination identifier communicated in the image information or in a separate command communicated from the MFP device during the same communication session with the service.

In an alternative and optional mode of operation, a second destination identifier associated with an information recording feature is identified, as indicated in optional block 960. As described above, the second destination can be identified via one or more of an email address, a facsimile address (i.e., a phone number) or a list address. A list address includes a name along with one of the email address, the facsimile address or both addresses. When a list address is used to identify the second destination, a user name and a code identifying a select priority for delivering a copy of the image information from the MFP device as stored in a profile are used to control delivery of the copy.

Once the second identifier has been identified in block 960, the facsimile format message is forwarded to the second destination in accordance with the profile information associated with the MFP device that generated the message, as shown in I/O block 970. The copy of the message originating with the MFP device and intended for delivery to one or more recipients may be stored, indexed and made available in accordance with one or more compliance standards for recording communications.

As described above, the flow diagrams of FIGS. 4, 5, 8 and 9 show the architecture, functionality and operation of an implementation of example methods for communicating documents. The described functions can be embodied in source code including human-readable statements written in a programming language or machine code that comprises instructions recognizable by a suitable execution system such as a processor in a computer system. The machine code may be converted from the source code, etc. If embodied in hardware, each block may represent a circuit or a number of interconnected circuits to implement the specified logical function(s).

The foregoing description has been presented for purposes of illustration and description. It is not intended to be exhaustive or to limit the scope of the claims to the precise forms disclosed. Modifications or variations are possible in light of the above teachings. The embodiments discussed, however, were chosen and described to enable one of ordinary skill to utilize various embodiments of the present systems and methods. All such modifications and variations are within the scope of the appended claims when interpreted in accordance with the breadth to which they are fairly and legally entitled.

What is claimed is:

1. A multiple-function peripheral device, comprising:
   a packet-switched network interface communicatively coupled to a remote server via a data network; and
   an autonomous application programming interface configured to request electronic message information stored on a remote server from the remote server via the packet-switched network interface in a first mode of operation according to a timing specified by a configuration process of the multiple-function peripheral device, the electronic message information being associated with an identifier that uniquely identifies the multiple-function peripheral device as a destination of the electronic message.

2. The device of claim 1, wherein
   the electronic message information comprises one of a tagged image file format (TIFF) file, a portable document format (PDF) file, and instructions in a printer command language, and
   the autonomous application programming interface is associated with the identifier that uniquely identifies the multiple-function peripheral device.

3. The device of claim 1, wherein the identifier comprises a media access control address.

4. The device of claim 1, further comprising print logic configured to generate a printed representation of image information received from the remote server.

5. The device of claim 1, wherein the autonomous application programming interface is further configured to send electronic message information to a remote device via the packet-switched network interface in a second mode of operation.

6. The device of claim 5, wherein the autonomous application programming interface is further configured to receive the electronic message information from the remote server using commands in hypertext transfer protocol via a secure sockets layer.

7. The device of claim 5, wherein the autonomous application programming interface is further configured to communicate a source identifier associated with the multiple-function peripheral.

8. The device of claim 5, wherein the autonomous application programming interface is further configured to communicate user information.

9. A multiple-function peripheral device, comprising:
   a packet-switched network interface communicatively coupled to a remote server via a data network; and
   an autonomous application programming interface configured to request electronic message information stored on a remote server from the remote server via the packet-switched network interface in a first mode of operation, the electronic message information being associated with an identifier that uniquely identifies the multiple-function peripheral device as a destination of the electronic message,
   wherein the identifier comprises a combination of a media access control address and an Internet protocol address.

10. A method for processing documents, comprising:
    associating a first destination identifier with a multiple-function peripheral device coupled to a data network;
    receiving a facsimile format message intended for the multiple-function peripheral device as defined by the first destination identifier;
    storing the facsimile format message to a memory; and
    upon receipt of a request from the multiple-function peripheral device at a timing specified according to a configuration process of the multiple-function peripheral device, communicating the facsimile format message to the multiple-function peripheral device via commands in hypertext transfer protocol.

11. A method for processing documents, comprising:
    associating a first destination identifier with a multiple-function peripheral device coupled to a data network;

receiving a facsimile format message intended for the multiple-function peripheral device as defined by the first destination identifier;

storing the facsimile format message to a memory; and upon receipt of a request from the multiple-function peripheral device, communicating the facsimile format message to the multiple-function peripheral device via commands in hypertext transfer protocol;

identifying a second destination identifier associated with an information recording feature; and forwarding the facsimile format message intended for the multiple-function device to the second destination.

12. The method of claim 10, wherein the communicating includes generating extensible markup language commands.

13. The method of claim 10, wherein the communicating includes transferring commands via a secure sockets layer.

14. The method of claim 10, wherein the communicating includes transferring a stream of information compatible with a printer command language.

15. A method for processing documents, comprising:

registering a user of a multiple-function peripheral device, the registering including collecting information related to a network location and type of the multiple-function peripheral device and storing the information to a memory;

associating the user with a first identifier that uniquely identifies the multiple-function peripheral device on a data network;

accepting image information via commands in hypertext transfer protocol from the multiple-function peripheral device;

converting the image information into a facsimile format message; and communicating the facsimile format message.

16. The method of claim 15, wherein the registering a user includes receiving a username and a password.

17. The method of claim 15, wherein the associating the user includes recording a media access control address.

18. The method of claim 15, wherein the accepting image information includes accepting the image information using a secure sockets layer.

19. The method of claim 15, further comprising:

identifying a second destination identifier associated with an information recording feature; and forwarding the facsimile format message to the second destination.

20. The method of claim 19, further comprising:

preparing a custom cover page including one or more of the second destination identifier, a provider name, a date, a time, a number of pages in the facsimile format message, and a subject message comprising the name of the user; and concatenating the facsimile format message to the custom cover page.

* * * * *

UNITED STATES PATENT AND TRADEMARK OFFICE
Certificate

Patent No. 8,116,303 B2                                    Patented: February 14, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Francis Toscano, Kendall Park, NJ (US); Samuel Nathan Kamens, Highland Park, NJ (US); Joachim Braun, Freehold, NJ (US); and Joseph Merces, Middletown, NJ (US).

Signed and Sealed this Thirtieth Day of October 2012.

*AYAZ SHEIKH*
*Supervisory Patent Examiner*
*Art Unit 2476*
*Technology Center 2400*